US012574095B2

(12) United States Patent
Khoshnevisan et al.

(10) Patent No.: US 12,574,095 B2
(45) Date of Patent: Mar. 10, 2026

(54) CONFIGURATION OF BEAM FAILURE RECOVERY SEARCH SPACE SET FOR PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Wooseok Nam, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 17/817,570

(22) Filed: Aug. 4, 2022

(65) Prior Publication Data
US 2023/0038082 A1 Feb. 9, 2023

Related U.S. Application Data

(60) Provisional application No. 63/203,988, filed on Aug. 5, 2021.

(51) Int. Cl.
*H04B 7/06* (2006.01)
*H04B 7/08* (2006.01)
(Continued)

(52) U.S. Cl.
CPC ......... *H04B 7/06964* (2023.05); *H04B 7/088* (2013.01); *H04W 16/28* (2013.01);
(Continued)

(58) Field of Classification Search
CPC .... H04B 7/088; H04B 7/0639; H04B 7/0665; H04B 7/0695; H04W 16/28; H04W 24/08;
(Continued)

(56) References Cited

U.S. PATENT DOCUMENTS

2019/0349061 A1* 11/2019 Cirik ..................... H04L 1/0026
2021/0045147 A1* 2/2021 Zhou ..................... H04L 5/0098
(Continued)

FOREIGN PATENT DOCUMENTS

CN 111742502 A 10/2020

OTHER PUBLICATIONS

U.S. Appl. No. 63/168,248, filed Mar. 30, 2021 (Year: 2021).*
(Continued)

*Primary Examiner* — Sun Jong Kim
(74) *Attorney, Agent, or Firm* — Harrity & Harrity, LLP

(57) ABSTRACT
The present disclose generally relates to wireless communication. In some aspects, a user equipment (UE) may receive information configuring a first search space (SS) set and a second SS set, wherein the first SS set is linked with the second SS set for physical downlink control channel (PDCCH) repetition, and wherein the first SS set is a recovery search space identifier configured SS set. The UE may monitor for a first one or more PDCCH candidates in the first SS set and a second one or more PDCCH candidates in the second SS set, wherein the first one or more PDCCH candidates and the second one or more PDCCH candidates are occurrences of a beam failure recovery response downlink control information (DCI).

24 Claims, 13 Drawing Sheets

(51) Int. Cl.

| | |
|---|---|
| *H04W 16/28* | (2009.01) |
| *H04W 24/08* | (2009.01) |
| *H04W 72/1273* | (2023.01) |
| *H04W 72/23* | (2023.01) |
| *H04W 76/19* | (2018.01) |

(52) U.S. Cl.
CPC ....... *H04W 24/08* (2013.01); *H04W 72/1273* (2013.01); *H04W 72/23* (2023.01); *H04W 76/19* (2018.02)

(58) Field of Classification Search
CPC . H04W 72/1273; H04W 72/23; H04W 76/19; H04W 72/232; H04L 5/0053; H04L 5/0094; H04L 1/1664; H04L 1/1845; H04L 5/001; H04L 5/0048; H04L 5/0051; H04L 1/08
See application file for complete search history.

(56) References Cited

U.S. PATENT DOCUMENTS

| | | | | |
|---|---|---|---|---|
| 2021/0135713 | A1 | 5/2021 | Kang et al. | |
| 2021/0153074 | A1 | 5/2021 | Yang et al. | |
| 2022/0007371 | A1* | 1/2022 | Kyung .............. | H04W 72/0446 |
| 2022/0070899 | A1 | 3/2022 | Huang | |
| 2022/0124819 | A1 | 4/2022 | Zhang et al. | |
| 2022/0149922 | A1 | 5/2022 | Wang et al. | |
| 2022/0330060 | A1* | 10/2022 | Awadin ................ | H04B 7/0695 |
| 2023/0023825 | A1* | 1/2023 | Liu ........................ | H04L 5/0057 |
| 2024/0073816 | A1* | 2/2024 | Lai ........................ | H04L 5/0053 |
| 2024/0235783 | A1* | 7/2024 | Matsumura ........... | H04L 5/0094 |

OTHER PUBLICATIONS

Apple Inc: "On Multi-TRP Reliability Enhancement", R1-2105088, 3GPP TSG-RAN WG1 Meeting #105-e, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052011177, 12 Pages, paragraph [0006]—paragraph [0007].

International Search Report and Written Opinion—PCT/US2022/074624—ISA/EPO—Oct. 28, 2022.

Moderator (CMCC): "Summary#7 on Mechanisms to Support Group Scheduling for RRC_Connected UEs for NR MBS", 3GPP TSG RAN WG1 #105-e, R1-2106304, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 27, 2021, XP052015815, pp. 1-116, the whole document.

\* cited by examiner

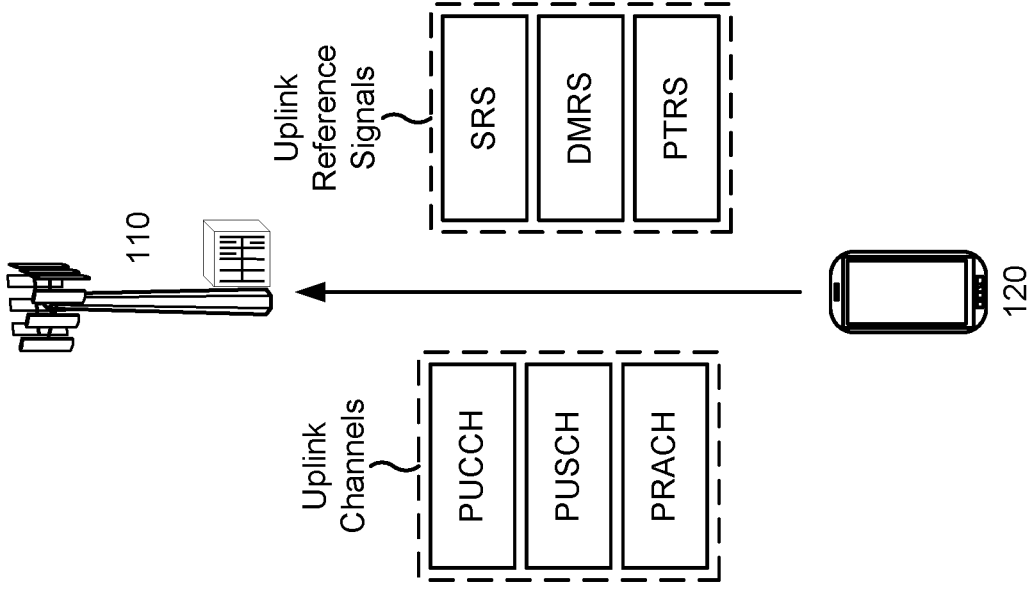
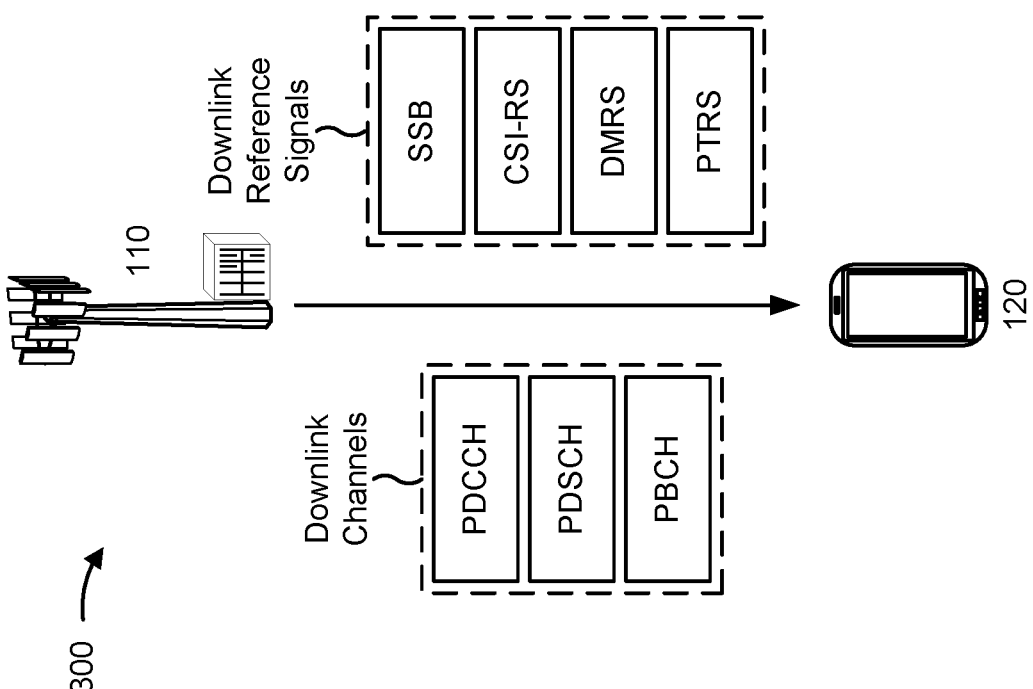
FIG. 3

TCI state for downlink communications

Spatial relation for uplink communications

910 Monitor, in a first monitoring occasion, a first SS set

920 Monitor, in a second monitoring occasion, a second SS set, wherein the first SS set is independent of the second SS set, and wherein physical downlink control channel repetition is disabled for beam failure recover response messaging in connection with the first SS set being independent of the second SS set

900

1000

1010 Receive information configuring a first SS set and a second SS set

1020 Monitor for a first one or more PDCCH candidates in the first SS set and a second one or more PDCCH candidates in the second SS set

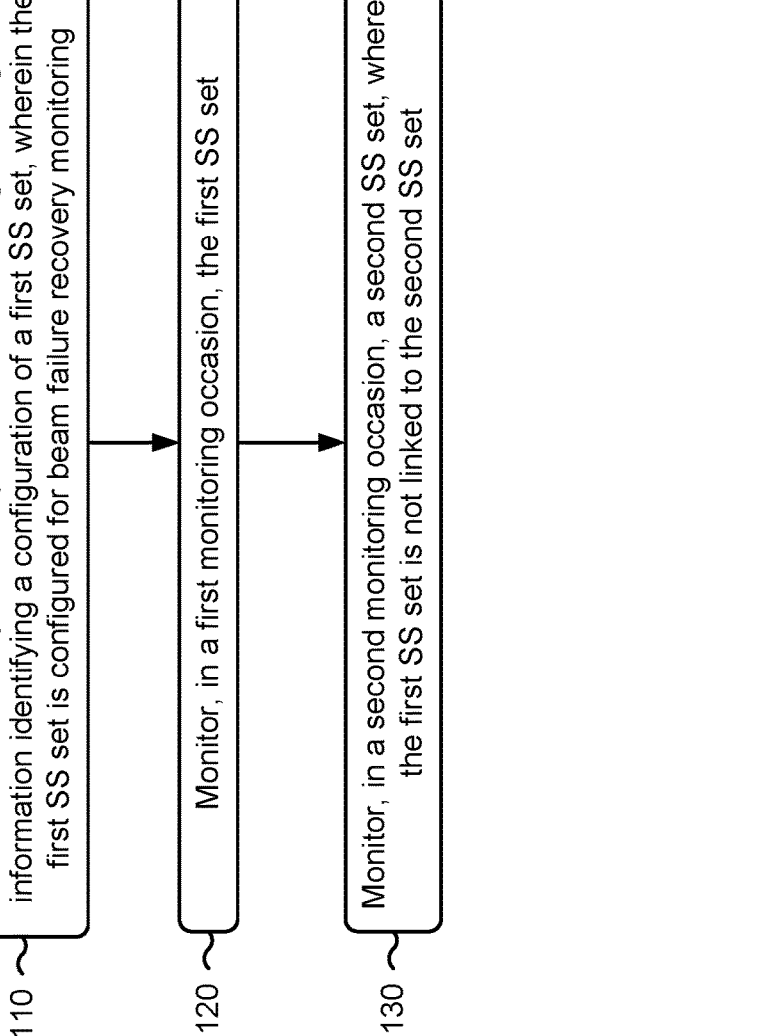

1110 Receive, in a recovery search space identifier message, configuration information identifying a configuration of a first SS set, wherein the first SS set is configured for beam failure recovery monitoring 1120 Monitor, in a first monitoring occasion, the first SS set 1130 Monitor, in a second monitoring occasion, a second SS set, wherein the first SS set is not linked to the second SS set

CONFIGURATION OF BEAM FAILURE RECOVERY SEARCH SPACE SET FOR PHYSICAL DOWNLINK CONTROL CHANNEL REPETITION

CROSS-REFERENCE TO RELATED APPLICATION

This patent application claims priority to U.S. Provisional Patent Application No. 63/203,988, filed on Aug. 5, 2021, entitled "CONFIGURATION OF BEAM FAILURE RECOVERY SEARCH SPACE SET FOR PHYSICAL DOWNLINK CONTROL CHANNEL REPETITION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuration of beam failure recovery synchronization signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some communications systems may allow physical downlink control channel (PDCCH) repetition with linked PDCCH candidates across linked search space (SS) sets. However, behavior of a user equipment (UE) and a network node (e.g., a base station) may not be deterministic, which may result in a loss of synchronization between the UE and the network node, such as when the UE is provided by a first operator and has a first behavior and the network node is provided by a second operator and has a second behavior. As a result, some messages may be dropped and/or poor communication performance may be experienced. Some aspects described herein provide for configuration of an SS set associated with beam failure recovery (e.g., the recovery-SearchSpaceID SS set) when linked SS sets are enabled for a UE. For example, in a first case, the beam failure recovery SS set may not be permitted to be linked with any other search space set, and PDCCH repetition may be disabled for a beam failure recovery response PDCCH. In a second case, a first SS set (e.g., the beam failure recovery SS set) may be linked with a second SS set when the first SS set and the second SS set share a common configuration, such as sharing the same CORESET. In a third case, a first SS set (e.g., the beam failure recovery SS set) may be linked with a second SS set even when the first SS set and the second SS set do not share a common configuration, such as a common CORESET. In each case, behavior of a UE is defined, thereby enabling the UE to operate with linked PDCCH candidates enabled without ambiguity in the UE's behavior resulting in dropped communications or failure to complete a beam failure recovery procedure.

Some aspects described herein relate to a user equipment (UE) for wireless communication. The UE may include memory, one or more processors coupled to the memory, and instructions stored in the memory and executable by the one or more processors. The instructions may be executable by the one or more processors to cause the UE to receive, in a recovery search space identifier message, configuration information identifying a configuration of a first search space (SS) set, wherein the first SS set is configured for beam failure recovery monitoring. The instructions may be executable by the one or more processors to cause the UE to monitor, in a first monitoring occasion, the first SS set. The instructions may be executable by the one or more processors to cause the UE to monitor, in a second monitoring occasion, a second SS set, wherein the first SS set is not linked to the second SS set.

Some aspects described herein relate to an apparatus for wireless communication. The apparatus may include means for receiving, in a recovery search space identifier message, configuration information identifying a configuration of a first SS set, wherein the first SS set is configured for beam failure recovery monitoring. The apparatus may include means for monitoring, in a first monitoring occasion, the first SS set. The apparatus may include means for monitoring, in a second monitoring occasion, a second SS set, wherein the first SS set is not linked to the second SS set.

Some aspects described herein relate to a non-transitory computer-readable medium that stores a set of instructions for wireless communication. The set of instructions, when executed by one or more processors of a UE, may cause the UE to receive, in a recovery search space identifier message, configuration information identifying a configuration of a first SS set, wherein the first SS set is configured for beam failure recovery monitoring. The set of instructions, when executed by one or more processors of a UE, may cause the UE to monitor, in a first monitoring occasion, the first SS set. The set of instructions, when executed by one or more processors of a UE, may cause the UE to monitor, in a second monitoring occasion, a second SS set, wherein the first SS set is not linked to the second SS set.

Some aspects described herein relate to a method of wireless communication performed by a UE. The method may include receiving, in a recovery search space identifier message (e.g., a message associated with a recovery search space identifier), configuration information identifying a configuration of a first SS set, wherein the first SS set is configured for beam failure recovery monitoring. The method may include monitoring, in a first monitoring occasion, the first SS set. The method may include monitoring, in a second monitoring occasion, a second SS set, wherein the first SS set is not linked to the second SS set.

Some aspects described herein relate to a UE for wireless communication. The UE may include memory, one or more processors coupled to the memory, and instructions stored in the memory and executable by the one or more processors. The instructions may be executable by the one or more processors to cause the UE to monitor, in a first monitoring occasion, a first SS set. The instructions may be executable by the one or more processors to cause the UE to monitor, in a second monitoring occasion, a second SS set, wherein the first SS set is independent of the second SS set, and wherein physical downlink control channel repetition is disabled for beam failure recover response messaging in connection with the first SS set being independent of the second SS set.

Some aspects described herein relate to a UE for wireless communication. The UE may include memory, one or more processors coupled to the memory, and instructions stored in the memory and executable by the one or more processors. The instructions may be executable by the one or more processors to cause the UE to receive information configuring a first SS set and a second SS set, wherein the first SS set is linked with the second SS set for physical downlink control channel (PDCCH) repetition, and wherein the first SS set is a recovery search space identifier configured SS set. The instructions may be executable by the one or more processors to cause the UE to monitor for a first one or more PDCCH candidates in the first SS set and a second one or more PDCCH candidates in the second SS set, wherein the first one or more PDCCH candidates and the second one or more PDCCH candidates are occurrences of a beam failure recovery response downlink control information (DCI).

Some aspects described herein relate to a method of wireless communication performed by a UE. The method may include monitoring, in a first monitoring occasion, a first SS set. The method may include monitoring, in a second monitoring occasion, a second SS set, wherein the first SS set is independent of the second SS set, and wherein physical downlink control channel repetition is disabled for beam failure recover response messaging in connection with the first SS set being independent of the second SS set.

Some aspects described herein relate to a method of wireless communication performed by a UE. The method may include receiving information configuring a first SS set and a second SS set, wherein the first SS set is linked with the second SS set for PDCCH repetition, and wherein the first SS set is a recovery search space identifier configured SS set. The method may include monitoring for a first one or more PDCCH candidates in the first SS set and a second one or more PDCCH candidates in the second SS set, wherein the first one or more PDCCH candidates and the second one or more PDCCH candidates are occurrences of a beam failure recovery response DCI.

Some aspects described herein relate to a non-transitory computer-readable medium that stores one or more instructions for wireless communication by a UE. The one or more instructions, when executed by one or more processors of the UE, may cause the UE to monitor, in a first monitoring occasion, a first SS set. The one or more instructions, when executed by one or more processors of the UE, may cause the UE to monitor, in a second monitoring occasion, a second SS set, wherein the first SS set is independent of the second SS set, and wherein physical downlink control channel repetition is disabled for beam failure recover response messaging in connection with the first SS set being independent of the second SS set.

Some aspects described herein relate to a non-transitory computer-readable medium that stores one or more instructions for wireless communication by a UE. The one or more instructions, when executed by one or more processors of the UE, may cause the one or more processors to receive information configuring a first SS set and a second SS set, wherein the first SS set is linked with the second SS set for PDCCH repetition, and wherein the first SS set is a recovery search space identifier configured SS set. The one or more instructions, when executed by one or more processors of the UE, may cause the one or more processors of the UE to monitor for a first one or more PDCCH candidates in the first SS set and a second one or more PDCCH candidates in the second SS set, wherein the first one or more PDCCH candidates and the second one or more PDCCH candidates are occurrences of a beam failure recovery response DCI.

Some aspects described herein relate to an apparatus for wireless communication. The apparatus may include means for monitoring, in a first monitoring occasion, a first SS set. The apparatus may include means for monitoring, in a second monitoring occasion, a second SS set, wherein the first SS set is independent of the second SS set, and wherein physical downlink control channel repetition is disabled for beam failure recover response messaging in connection with the first SS set being independent of the second SS set.

Some aspects described herein relate to an apparatus for wireless communication. The apparatus may include means for receiving information configuring a first SS set and a second SS set, wherein the first SS set is linked with the second SS set for PDCCH repetition, and wherein the first SS set is a recovery search space identifier configured SS set. The apparatus may include means for monitoring for a first one or more PDCCH candidates in the first SS set and a second one or more PDCCH candidates in the second SS set, wherein the first one or more PDCCH candidates and the second one or more PDCCH candidates are occurrences of a beam failure recovery response DCI.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

FIGS. 9-11 are diagrams illustrating example processes associated with configuration of a beam failure recovery SS set for PDCCH repetition, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
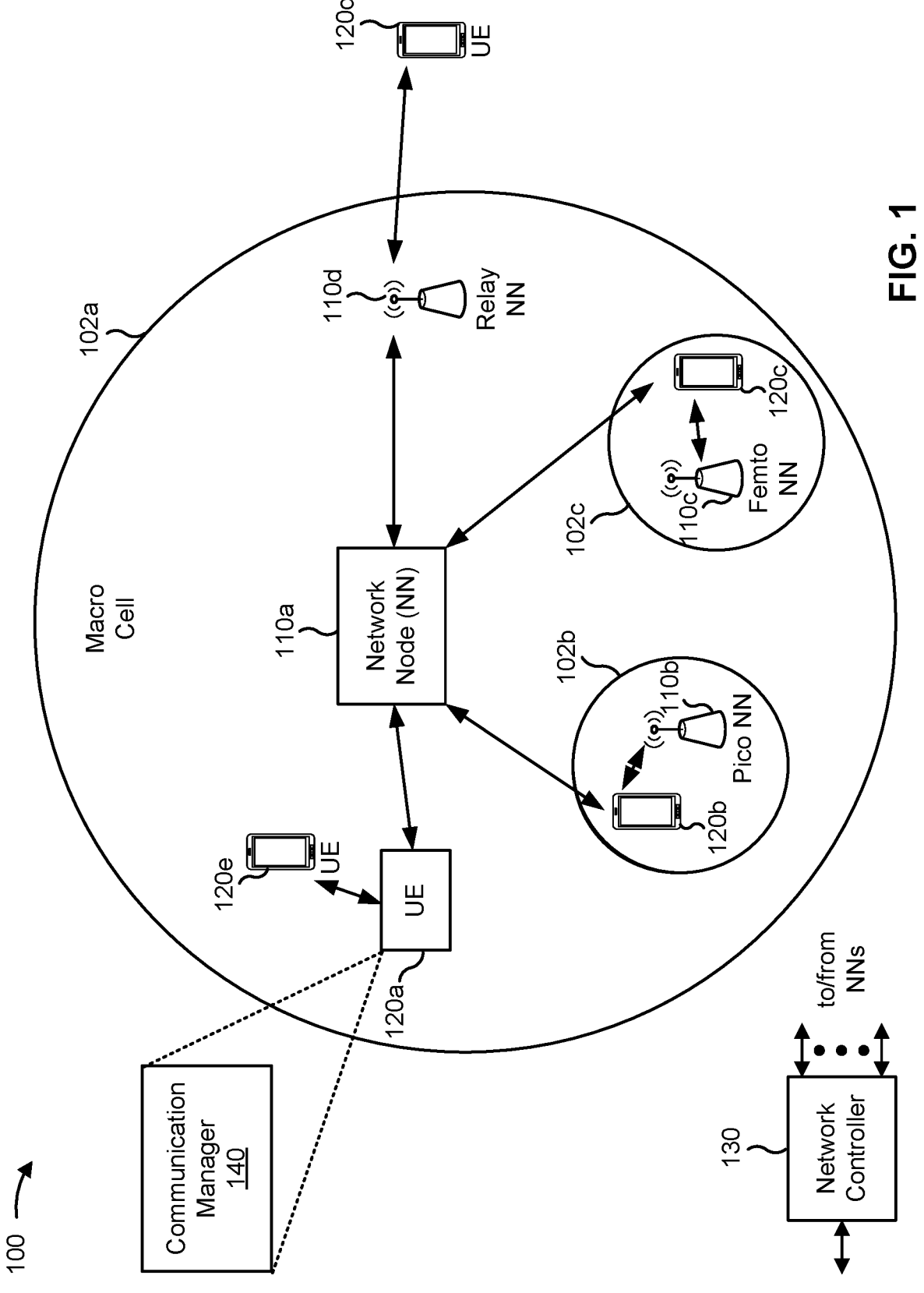
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as a network node (NN) 110a, a NN 110b, a NN 110c, and a NN 110d), a user equipment (UE)

120 or multiple UEs 120 (shown as a UE 120a, a UE 120b, a UE 120c, a UE 120d, and a UE 120e), and/or other network entities. A network entity 110 is an entity that communicates with UEs 120. A network entity 110 (sometimes referred to as a base station or BS) may include, for example, an NR base station, an LTE base station, a Node B, an eNB (e.g., in 4G), a gNB (e.g., in 5G), an access point, and/or a transmission reception point (TRP). Each network entity 110 may provide communication coverage for a particular geographic area. In the Third Generation Partnership Project (3GPP), the term "cell" can refer to a coverage area of a network entity 110 and/or a base station subsystem serving this coverage area, depending on the context in which the term is used.

A network entity 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network entity 110 for a macro cell may be referred to as a macro base station. A network entity 110 for a pico cell may be referred to as a pico base station. A network entity 110 for a femto cell may be referred to as a femto base station or an in-home base station. In the example shown in FIG. 1, the NN 110a may be a macro base station for a macro cell 102a, the NN 110b may be a pico base station for a pico cell 102b, and the NN 110c may be a femto base station for a femto cell 102c. A base station may support one or multiple (e.g., three) cells.

In some examples, a cell may not necessarily be stationary, and the geographic area of the cell may move according to the location of a network entity 110 that is mobile (e.g., a mobile base station). In some examples, the network entities 110 may be interconnected to one another and/or to one or more other network entities 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity 110 or a UE 120) and send a transmission of the data to a downstream station (e.g., a UE 120 or a network entity 110). A relay station may be a UE 120 that can relay transmissions for other UEs 120. In the example shown in FIG. 1, the NN 110d (e.g., a relay base station) may communicate with the NN 110a (e.g., a macro base station) and the UE 120d in order to facilitate communication between the NN 110a and the UE 120d. A network entity 110 that relays communications may be referred to as a relay station, a relay base station, a relay, or the like.

The wireless network 100 may be a heterogeneous network that includes network entities 110 of different types, such as macro base stations, pico base stations, femto base stations, relay base stations, or the like. These different types of network entities 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities 110 and may provide coordination and control for these network entities 110. The network controller 130 may communicate with the network entities 110 via a backhaul communication link. The network entities 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may monitor, in a first monitoring occasion, a first search space (SS) set; and monitor, in a second monitoring occasion, a second SS set, wherein the first SS set is independent of the second SS set, and wherein physical downlink control channel repetition is disabled for beam failure recover response messaging in connection with the first SS set being independent of the second SS set. Additionally, or alternatively, the communication manager 140 may receive information configuring a first SS set and a second SS set, wherein the first SS set is linked with the second SS set for PDCCH repetition, wherein the first SS set is a recovery search space identifier configured SS set; and monitor for a first one or more PDCCH candidates in the first SS set and a second one or more PDCCH candidates in the second SS set, wherein the first one or more PDCCH candidates and the second one or more PDCCH candidates are occurrences of a beam failure recovery response DCI. Additionally, or alternatively, the communication manager 140 may receive, in a recovery search space identifier message, configuration information identifying a configuration of a first SS set, wherein the first SS set is configured for beam failure recovery monitoring; monitor, in a first monitoring occasion, the first SS set; and monitor, in a second monitoring occasion, a second SS set, wherein the first SS set is not linked to the second SS set. Additionally, or alternatively, the communication manager 140 may perform one or more other operations described herein.

As indicated above, FIG. 1 is provided as an example. Other examples may differ from what is described with regard to FIG. 1.

Figure 2:
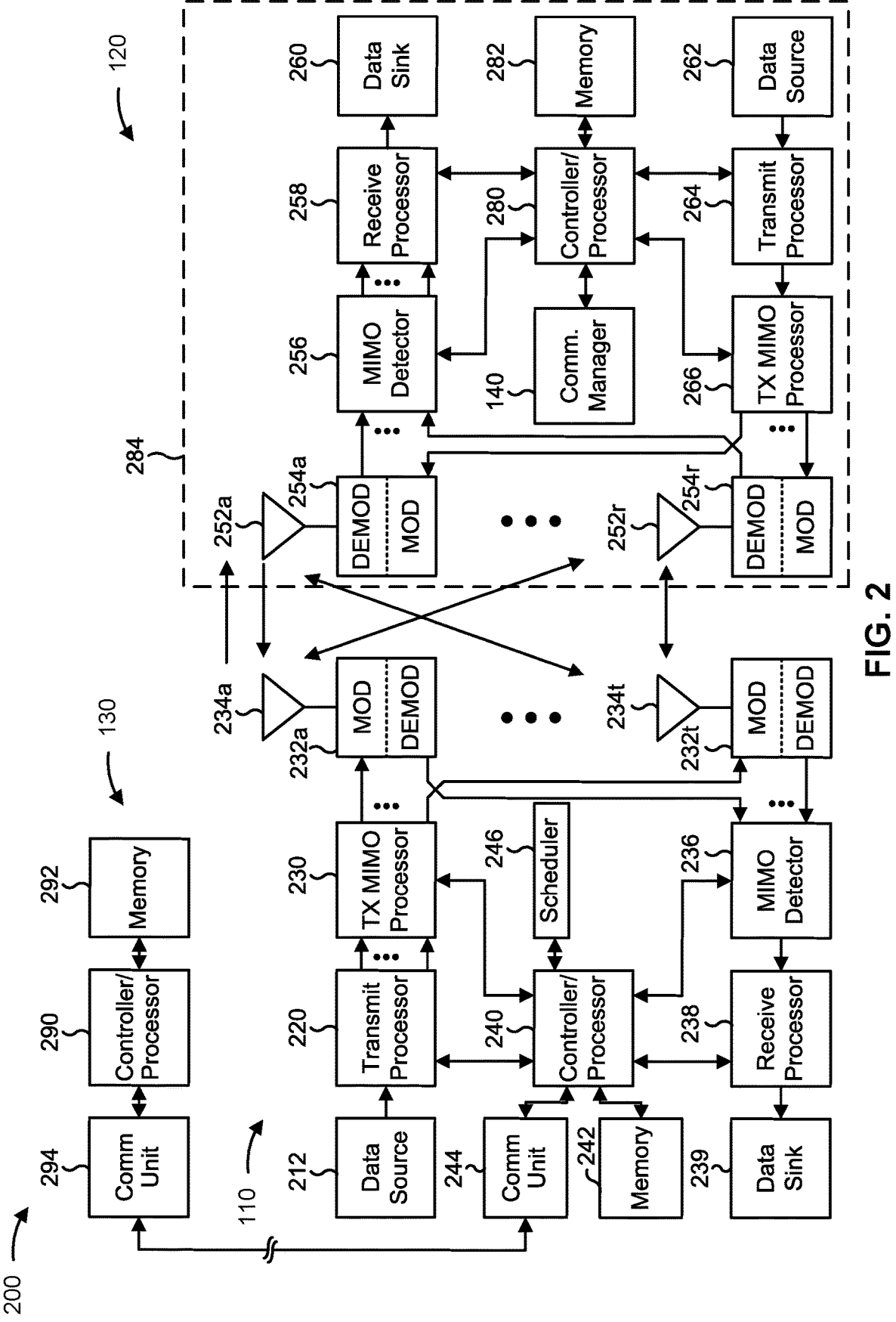
FIG. 2 is a diagram illustrating an example of a base station in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1).

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the network entity 110, the controller/processor 280 of the UE 120, and/or any other component(s) of FIG. 2 may perform one or more techniques associated with configuration of a beam failure recovery SS set for PDCCH repetition, as described in more detail elsewhere herein. For example, the controller/processor 240 of the network entity 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for monitoring, in a first monitoring occasion, a first SS set; and/or means for monitoring, in a second monitoring occasion, a second SS set, wherein the first SS set is independent of the second SS set, and wherein physical downlink control channel repetition is disabled for beam failure recover response messaging in connection with the first SS set being independent of the second SS set. In some aspects, the UE includes means for receiving information configuring a first SS set and a second SS set, wherein the first SS set is linked with the second SS set for PDCCH repetition, wherein the first SS set is a recovery search space identifier configured SS set; and/or means for monitoring for a first one or more PDCCH candidates in the first SS set and a second one or more PDCCH candidates in the second SS set, wherein the first one or more PDCCH candidates and the second one or more PDCCH candidates are occurrences of a beam failure recovery response DCI. In some aspects, the UE includes means for receiving, in a recovery search space identifier message, configuration information identifying a configuration of a first SS set, wherein the first SS set is configured for beam failure recovery monitoring; means for monitoring, in a first monitoring occasion, the first SS set; and means for monitoring, in a second monitoring occasion, a second SS set, wherein the first SS set is not linked to the second SS set. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a network entity 110 to a UE 120, and uplink channels and uplink reference signals may carry information from a UE 120 to a network entity 110.

As shown, a downlink channel may include a physical downlink control channel (PDCCH) that carries DCI (e.g., DCI may be received in a PDCCH candidate that UE 120 monitors in a search space (SS) set and decodes using blind decoding), a physical downlink shared channel (PDSCH) that carries downlink data, or a physical broadcast channel (PBCH) that carries system information, among other examples. PDSCH communications may be scheduled by PDCCH communications. The UE 120 may monitor for downlink communications in a monitoring occasion (MO). For example, the UE 120 may monitor for a PDCCH candidate in a PDCCH MO. Each PDCCH candidate may be defined in connection with SS set configuration. For example, the UE 120 may receive configuration information identifying a control resource set (CORESET), an associated active transmission configuration indicator (TCI) state, or an associated SS set, among other examples, as described in more detail herein. A configuration for the CORESET (e.g., which the UE 120 may receive via radio resource control (RRC) signaling) may include a configuration for a quantity of resource blocks in a CORESET, a frequency domain configuration, or a quantity of symbols in the CORESET, among other examples.

The SS set may be configured for a bandwidth part and associated with the CORESET. For example, up to 10 SS sets may be configured in a bandwidth part of a component carrier, and the UE 120 may receive signaling identifying an SS set that is associated with a configured CORESET. In this case, SS set configuration information (e.g., which the UE 120 may receive via RRC signaling) may include information identifying an associated CORESET, a monitoring slot periodicity and offset (e.g., information identifying which PDCCH MOs are associated with the SS set), an SS set type (e.g., whether a configured SS set is a common search space (CSS) or a UE-specific search space (USS)), a set of DCI formats to monitor in the PDCCH MOs, or a quantity of PDCCH candidates associated with a particular aggregation level (e.g., a quantity of control channel elements (CCEs)), among other examples.

As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (RS) (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The network entity 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 110 may configure a set of CSI-RSs for the UE 120, and the UE 120 may measure the configured set of CSI-RSs. Based at least in part on the measurements, the UE 120 may perform channel estimation and may report channel estimation parameters to the network entity 110 (e.g., in a CSI report), such as a CQI, a precoding matrix indicator (PMI), a CSI-RS resource indicator (CRI), a layer indicator (LI), a rank indicator (RI), or an RSRP, among other examples. The network entity 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The network entity 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
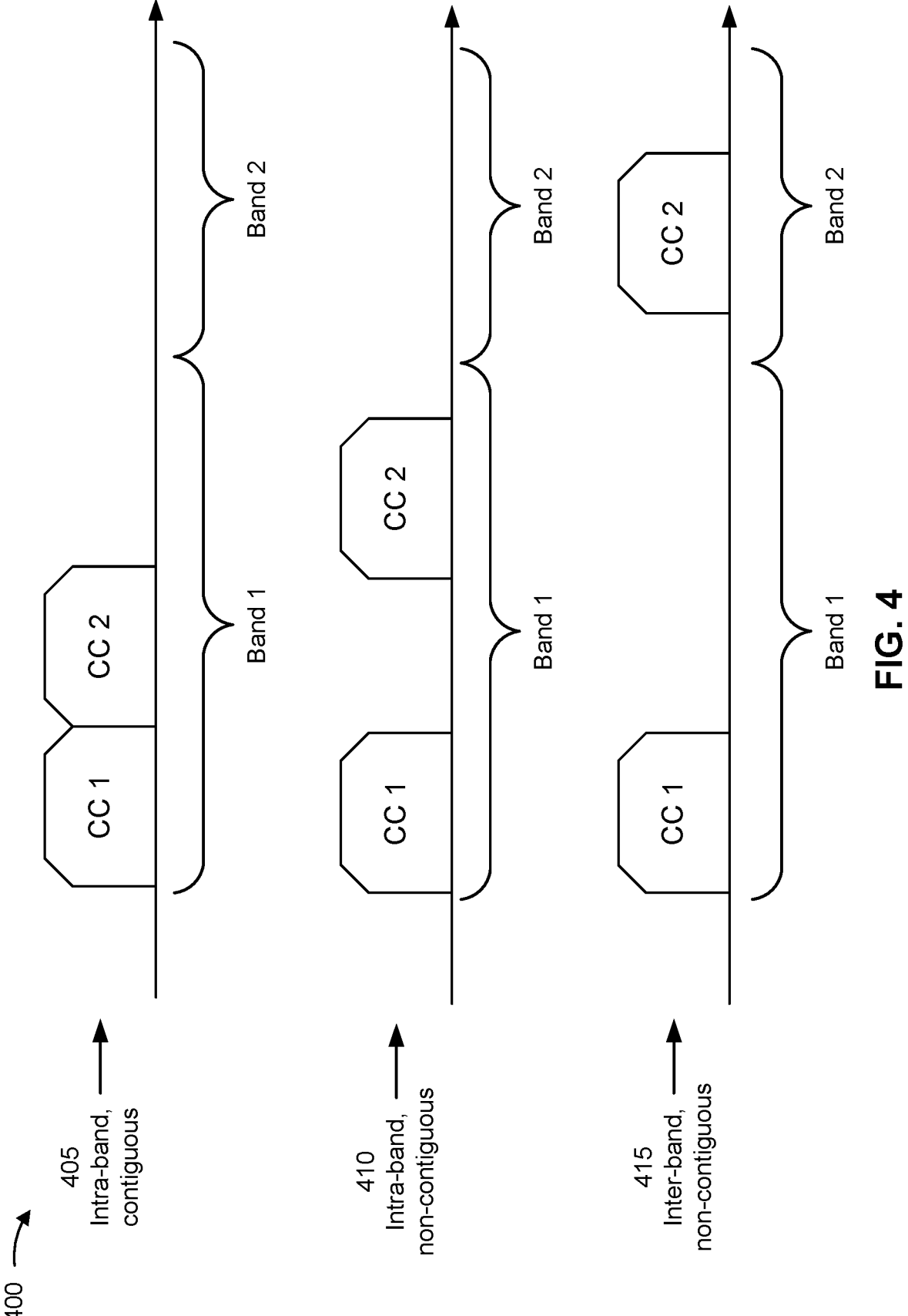
FIG. 4 is a diagram illustrating an example of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network entity 110 may configure carrier aggregation for a UE 120, such as in an RRC message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, carrier aggregation may be configured in an intra-band non-contiguous mode where the aggregated carriers are non-contiguous to one another and are in the same band. As shown by reference number 415, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). The primary carrier, which may be referred to as a "primary component carrier" (PCC), may carry control information (e.g., downlink control information and/or scheduling information) for scheduling data communications on one or more secondary carriers (which may be referred to as a "secondary component carrier" (SCC)). This scenario may be referred to as "cross-carrier scheduling". A carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
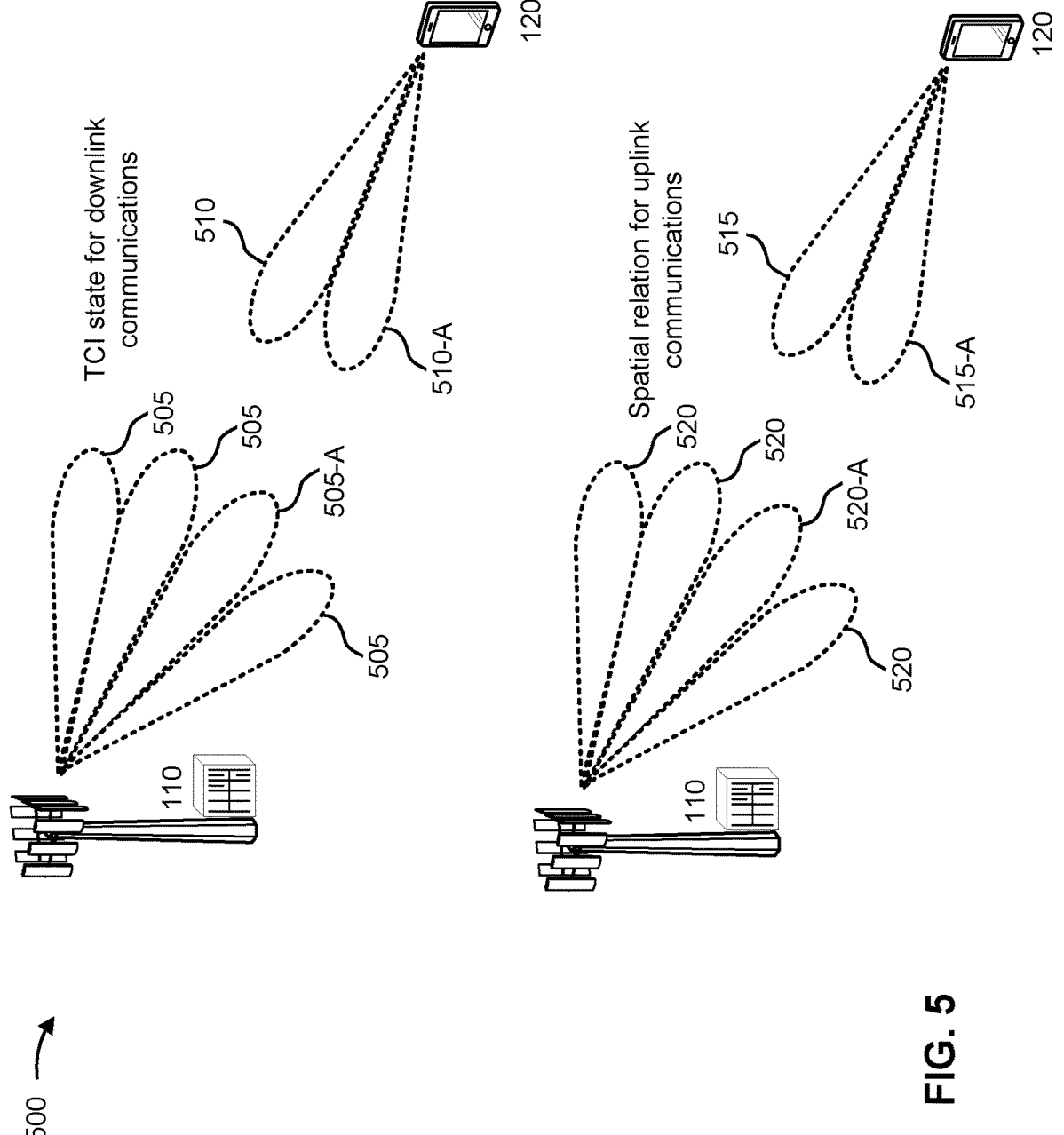
FIG. 5 is a diagram illustrating an example of using beams for communications between a base station and a UE, in accordance with the present disclosure.

FIG. 5 is a diagram illustrating an example 500 of using beams for communications between a base station and a UE, in accordance with the present disclosure. As shown in FIG. 5, a network entity 110 and a UE 120 may communicate with one another.

The network entity 110 may transmit to UEs 120 located within a coverage area of the network entity 110. The network entity 110 and the UE 120 may be configured for beamformed communications, where the network entity 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The network entity 110 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the network entity 110 may select for transmissions to the UE 120. The UE 120 may thus attain and maintain a beam pair link (BPL) with the network entity 110 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 505 may be associated with an SSB, and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The network entity 110 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the network entity 110 indicating a BS transmit beam 505 via a TCJ indication.

The network entity 110 may maintain a set of activated TCJ states for downlink shared channel transmissions and a set of activated TCJ states for downlink control channel transmissions. The set of activated TCJ states for downlink shared channel transmissions may correspond to beams that the network entity 110 uses for downlink transmission on a PDSCH. The set of activated TCJ states for downlink control channel communications may correspond to beams that the network entity 110 may use for downlink transmission on a PDCCH or in a CORESET. The UE 120 may also maintain a set of activated TCJ states for receiving the downlink shared channel transmissions and the CORESET transmissions. If a TCJ state is activated for the UE 120, then the UE 120 may have one or more antenna configurations based at least in part on the TCJ state, and the UE 120 may not need to reconfigure antennas or antenna weighting configurations. In some examples, the set of activated TCJ states (for example, activated PDSCH TCJ states and activated CORESET TCJ states) for the UE 120 may be configured by a configuration message, such as an RRC message.

Similarly, for uplink communications, the UE 120 may transmit in the direction of the network entity 110 using a directional UE transmit beam, and the network entity 110 may receive the transmission using a directional BS receive beam. Each UE transmit beam may have an associated beam ID, beam direction, or beam symbols, among other examples. The UE 120 may transmit uplink communications via one or more UE transmit beams 515.

The network entity 110 may receive uplink transmissions via one or more BS receive beams 520. The network entity 110 may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the network entity 110 may transmit an indication of which UE transmit beam 515 is identified by the network entity 110 as a preferred UE transmit beam, which the network entity 110 may select for transmissions from the UE 120. The UE 120 and the network entity 110 may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

As indicated above, FIG. 5 is provided as an example. Other examples may differ from what is described with respect to FIG. 5.

Figure 6:
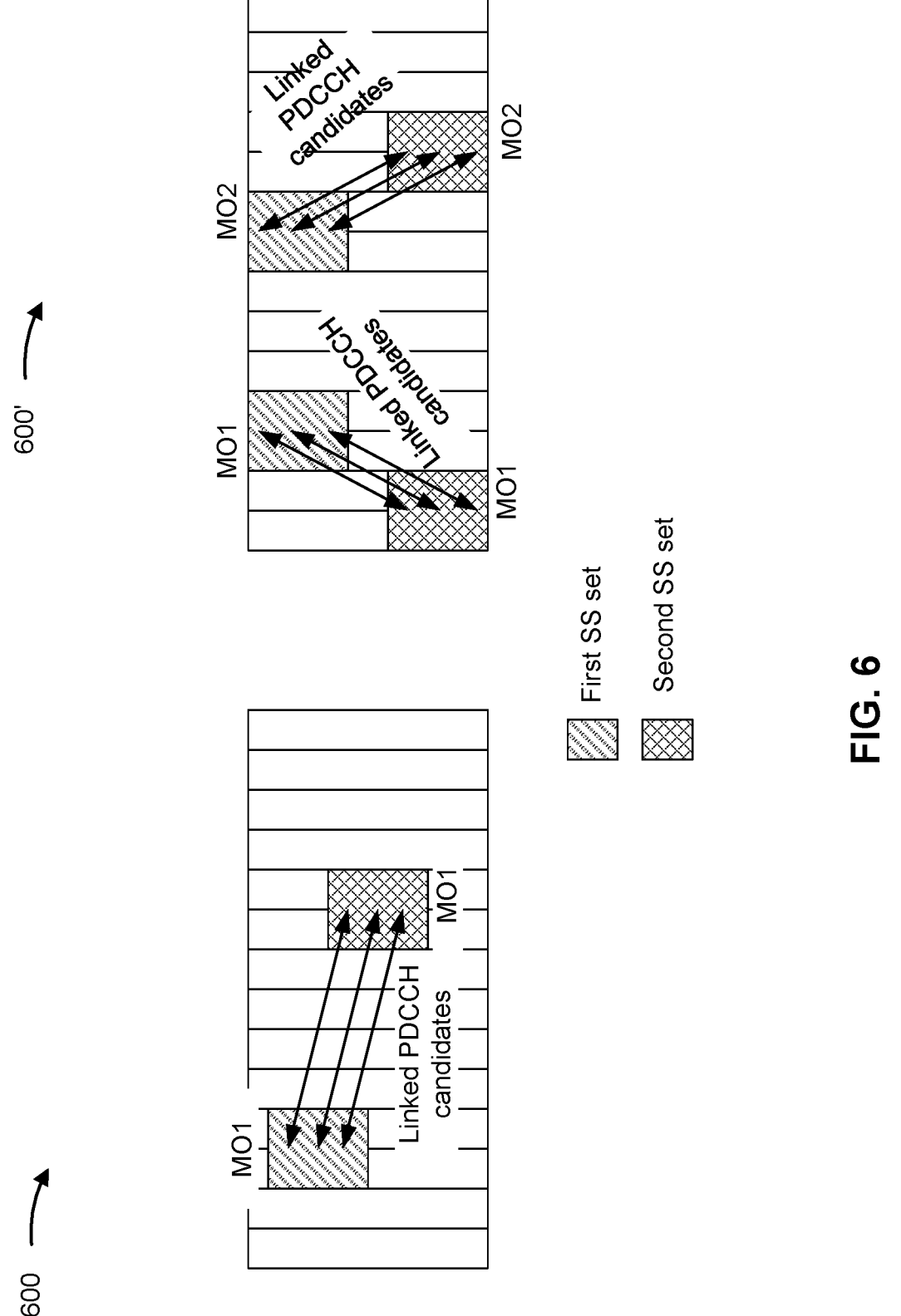
FIG. 6 is a diagram illustrating an example of linked physical downlink control channel (PDCCH) candidates, in accordance with the present disclosure.

FIG. 6 is a diagram illustrating examples 600/600' of linked PDCCH candidates, in accordance with the present disclosure.

In some communications systems, linking of PDCCH candidates may be enabled in connection with PDCCH repetition. When a first PDCCH candidate is linked with a second PDCCH candidate, the first PDCCH candidate and the second PDCCH candidate may have the same aggregation level (e.g., the same quantity of CCEs) and may convey the same DCI payload. In this case, a UE may be configured with information identifying the linking between the first PDCCH candidate and the second PDCCH candidate, and may individually decode each PDCCH candidate or use soft-combining to decode the two PDCCH candidates together.

The UE may receive RRC configuration information identifying the linking between SS sets that include the PDCCH candidate. For example, the UE may identify a first SS set with a first one or more PDCCH candidates and a second SS set with a second one or more PDCCH candidates. In this case, first MOs of the first SS set are one-to-one mapped to second MOs of the second SS set. For example, as shown by example 600, in intra-slot PDCCH repetition, a UE may be configured to monitor first PDCCH candidates in MO1 of the first SS set and second PDCCH candidates in MO1 of the second SS set, which may be linked SS sets. Similarly, as shown in example 600', in intra-slot PDCCH repetition, the UE may be configured to monitor linked PDCCH candidates in respective MO1s of the first SS set and the second SS set, and to monitor linked PDCCH candidates in respective MO2s of the first SS set and the second SS set. Although the aforementioned examples are described in terms of intra-slot PDCCH repetition, inter-slot PDCCH repetition is also contemplated.

As indicated above, FIG. 6 is provided as an example. Other examples may differ from what is described with respect to FIG. 6.

Figure 7:
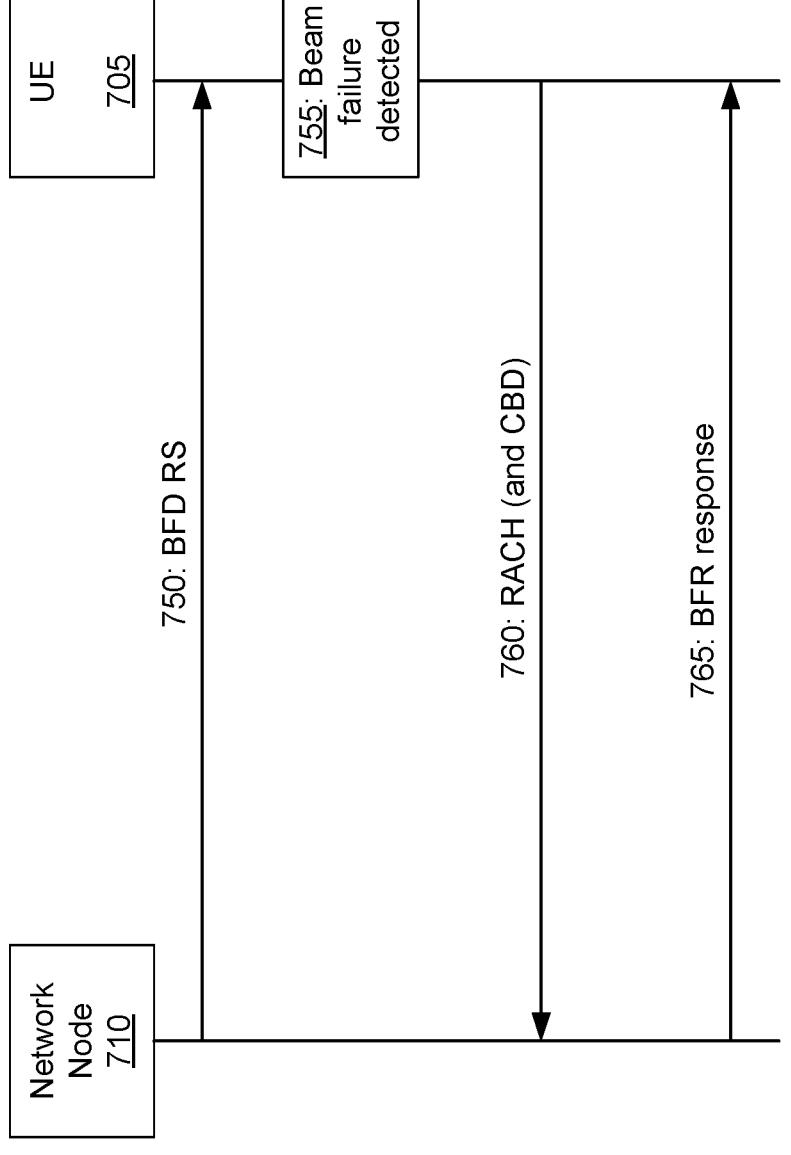
FIG. 7 is a diagram illustrating an example of beam failure recovery, in accordance with the present disclosure.

FIG. 7 is a diagram illustrating an example 700 of beam failure recovery, in accordance with the present disclosure. As shown in FIG. 7, example 700 includes a UE 705 and a network node 710. Network node 710 may be associated with a PCell or a primary secondary cell (PScell).

As further shown in FIG. 7, and by reference numbers 750 and 755, UE 705 may detect a beam failure based at least in part on attempting to receive a beam failure detection (BFD) reference signal (RS). For example, network node 710 may transmit BFD RSs associated with periodic CSI-RS resources configured for UE 705 using RRC signaling (e.g., an RRC parameter failureDetectionResources). At a physical layer, UE 705 may assess a radio link quality associated with a BFD RS set against a threshold quality level (e.g., a parameter Q-_out). In this case, if the radio link quality does not satisfy the threshold quality level, the physical layer of UE 705 may pass a beam failure detection indication to a higher layer (e.g., a medium access control (MAC) layer, an RRC layer, an application (APP) layer, etc.) indicating a beam failure.

As further shown in FIG. 7, and by reference number 760, UE 705 may initiate a random access channel (RACH) procedure to initiate beam recovery. For example, UE 705 may perform candidate beam detection (CBD) based at least in part on a periodic CSI-RS resource or SSB resource (e.g., which network node 710 may configure for UE 705 using RRC signaling, such as an RRC parameter canddiate-BeamRSList). UE 705 may identify an RS index (q_new) for beams with an RSRP that satisfies a threshold (e.g., a parameter Q_in). UE 705 initiates a contention-free RACH procedure based at least in part on a random access resource (e.g., a parameter ra-preamble-index) associated with the identified RS index (e.g., which may be represented by the parameter q_new).

As further shown in FIG. 7, and by reference number 765, UE 705 may monitor for a beam failure recovery response from network node 710. For example, UE 705 may monitor for a PDCCH in an SS set indicated by a parameter recov-erySearchSpacefD to detect DCI with a DCI format associated with a beam failure recovery response. A CORESET associated with the recoverySearchSpaceID may be unique to the SS set for beam failure recovery (e.g., the CORESET may not be used by other SS sets). UE 705 may use QCL parameters associated with q_new for PDCCH monitoring in the SS set and for receiving a corresponding PDSCH. Alternatively, when UE 705 receives configuration information activating a TCI state or one or more parameters associated therewith, UE 705 may use QCL parameters associated with the TCI state for monitoring in an SS set or for a corresponding PDSCH. The DCI format may have a cyclic redundancy check (CRC) that is scrambled based at least in part on a cell-specific radio network temporary identifier (C-RNTI) or an MCS C-RNTI (MCS-C-RNTI). If UE 705 receives a PDCCH with DCI including a beam failure recovery response within a configured window, beam failure recovery is complete for UE 705.

As indicated above, FIG. 7 is provided as an example. Other examples may differ from what is described with respect to FIG. 7.

As described above, some communications systems may allow PDCCH repetition with linked PDCCH candidates across linked SS sets. Some aspects described herein provide for configuration of an SS set associated with beam failure recovery (e.g., the recoverySearchSpaceID SS set) when linked SS sets are enabled for a UE. For example, in a first case, the beam failure recovery SS set may not be permitted to be linked with any other search space set, and PDCCH repetition may be disabled for a beam failure recovery response PDCCH. The first case reduces a processing, monitoring, and/or decoding complexity for the UE relative to allowing PDCCH repetition and SS set linking, thereby reducing a utilization of UE resources, such as processing resources or energy resources. In a second case, a first SS set (e.g., the beam failure recovery SS set) may be linked with a second SS set when the first SS set and the second SS set share a common configuration, such as sharing the same CORESET. The second case allows PDCCH repetition and SS set linking under a constraint (e.g., having the same configuration), which enables greater flexibility than the first case (e.g., in which PDCCH repetition and SS set liking is not permitted) with reduced processing, monitoring, and/or decoding complexity relative to allowing PDCCH repetition and SS set linking without the constraint. In a third case, a first SS set (e.g., the beam failure recovery SS set) may be linked with a second SS set even when the first SS set and the second SS set do not share a common configuration, such as a common CORESET. The third case enables PDCCH repetition and SS set linking without the constraint of sharing a common configuration, thereby providing greater flexibility than the first case and the second case. In each case, behavior of a UE is defined, thereby enabling the UE to operate with linked PDCCH candidates enabled without ambiguity in the UE's behavior resulting in dropped communications or failure to complete a beam failure recovery procedure.

Figure 8:
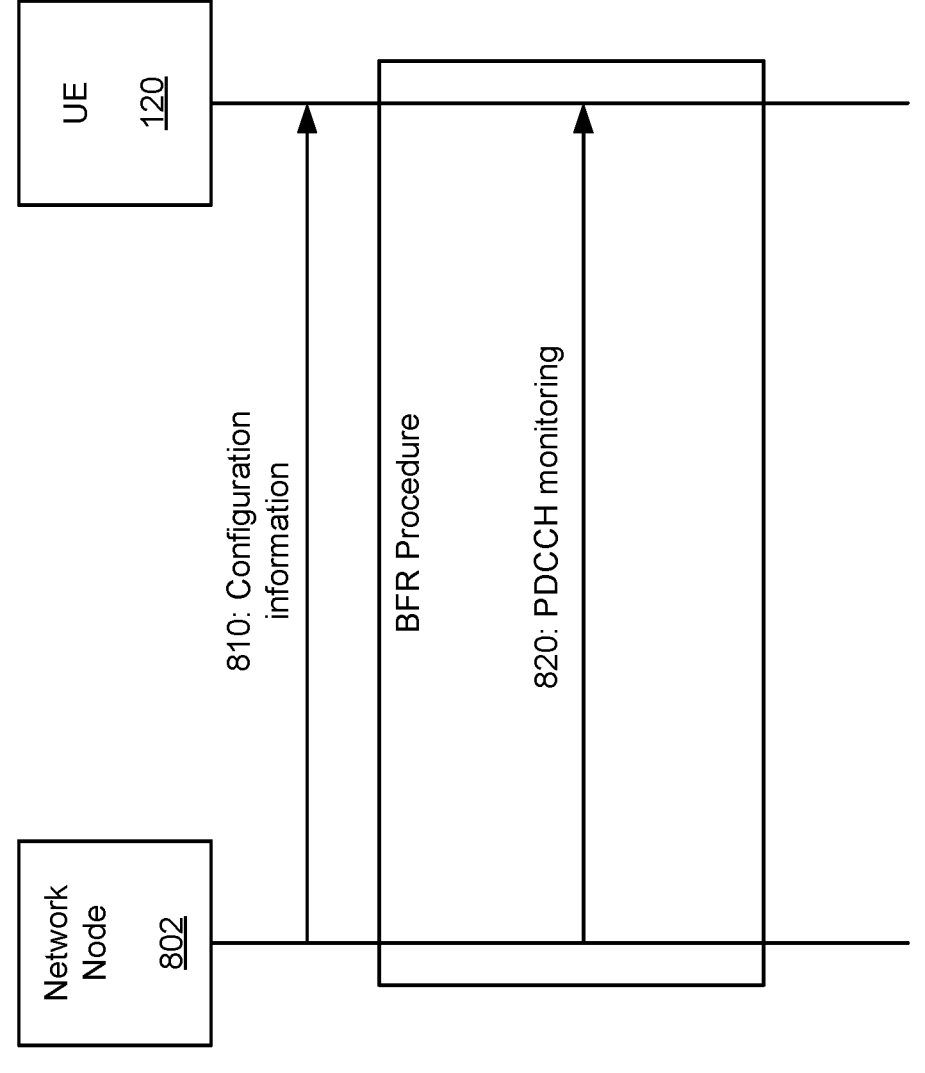
FIG. 8 is a diagram illustrating an example associated with configuration of a beam failure recovery search space (SS) set for PDCCH repetition, in accordance with the present disclosure.

FIG. 8 is a diagram illustrating an example 800 associated with configuration of a beam failure recovery SS set for PDCCH repetition, in accordance with the present disclosure. As shown in FIG. 8, example 800 includes communication between a network node 802 and a UE 120. In some aspects, network node 802 and UE 120 may be included in a wireless network, such as wireless network 100. Network node 802 and UE 120 may communicate via a wireless access link, which may include an uplink and a downlink.

As further shown in FIG. 8, and by reference number 810, UE 120 may receive configuration information (e.g., information associated with configuring a first SS set and/or a second SS set). For example, UE 120 may receive configuration information associated with configuring a beam failure recovery SS set. In this case, as described above, UE 120 may receive configuration information including a recoverSearchSpaceID parameter that identifies parameters of a beam failure recovery SS set for monitoring for PDCCH candidates (e.g., for detection of DCI with a CRC scrambled with a C-RNTI or MCS-C-RNTI as a beam failure recovery response). In some aspects, UE 120 may be configured for PDCCH repetition with linked PDCCH candidates across a plurality of linked SS sets.

In some aspects, UE 120 may receive configuration information that does not link the beam failure recovery SS set with another SS set. For example, network node 802 may enforce a rule that the beam failure recovery SS set is not to be linked with other SS sets (even when linked SS sets is enabled). For example, when the UE 120 receives the configuration information, the UE 120 may be configured with a recovery search space identifier (recoverySearchSpaceId) parameter. In this case, a second SS (e.g., the other SS sets) set may not be linked with a first SS (e.g., the beam failure recovery SS set) based at least in part on a recovery search space identifier message conveying a configuration of the first SS set. Alternatively, the other SS sets may not be linked with the beam failure recovery SS set based at least in part on a static rule (e.g., without configuration information indicating away from a linkage). Although the other SS sets may not be linked with the beam failure recovery SS set, the other SS sets may be linked with each other in some aspects. In another words, one of the other SS sets may be linked with another of the SS sets. The beam failure recovery set not being linked with another SS set may include the UE 120, when configured with the recovery search space identifier, not expecting the beam failure recovery SS space (configured with the recovery search space identifier) to be linked with any other SS set. In this case, if the UE 120 is configured with a first SS set for beam failure recovery, the first SS set is not linked with a second SS set (e.g., PDCCH repetition is configured for the first SS set, but the first SS set is not linked with the second SS set). In other words, when the UE 120 receives configuration information, the UE 120 may be configured with different DCIs. For example, when the UE 120 receives configuration information that does not link the beam failure recovery SS set with another SS set, the UE 120 may be receiving first DCI for the beam failure recovery SS set and second DCI (that is different from the first DCI) for the other SS set. In this case, based at least in part on the first DCI being different from the second DCI, the first SS set is not linked with the second SS set (for PDCCH repetition). By avoiding linking the SS sets, decoding, monitoring, and/or processing complexity is reduced, and the network node 110 may have greater flexibility in configuring the first SS set differently from the second SS set. In this case, the UE 120 may receive configuration information linking other SS sets (e.g., the aforementioned second SS set to a third SS set), but not the SS set for beam failure recovery. As a result, network node 802 may not use, and UE 120 may not monitor for, PDCCH repetition when monitoring for PDCCH candidates associated with the beam failure recovery SS set. In other words, the UE 120 may monitor for a first SS set and may separately monitor for a second SS set. In this way, the UE 120 can use different monitoring configurations for the first SS set and the second SS set, which may increase a flexibility in UE operation, thereby enabling reduced power consumption or processing power.

In some aspects, UE 120 may receive configuration information that links the beam failure recovery SS set with another SS set with a commonality condition satisfied. For example, network node 802 may link a first SS set for beam failure recovery with a second SS set (not explicitly configured for beam failure recovery) when the first SS set and the second SS set are associated with the same CORESET. In some aspects, the configuration information that links the beam failure recovery SS set with another SS set may include QCL information or a CORESET parameter. For example, the UE 120 may receive information identifying a QCL parameter for the beam failure recovery SS set and another SS set or information identifying a QCL relationship between the beam failure recovery SS set and another SS set. By linking SS sets, an effective aggregation level (AL) for the SS sets is increased. In other words, two linked aggregation level 16 (AL16) PDCCH candidates results in an effective AL of aggregation level 32 (AL32), which increases communication performance and/or a likelihood of successful reception. As another example, network node 802 may link a first SS set with a second SS set, and configure both the first SS set and the second SS set for beam failure recovery, when the first SS set and the second SS set are associated with the same CORESET. Network node 802 may use PDCCH repetition to transmit and UE 120 may monitor for PDCCH repetition when monitoring PDCCH candidates associated with the first SS set and the second SS set. In some aspects, UE 120 may use a common QCL parameter for monitoring for PDCCH candidates in the first SS set and the second SS set. For example, network node 802 may configure the first SS set and the second SS set with a common QCL assumption. In this case, the common QCL assumption may have the same QCL parameters as the q_new RS identified in connection with the beam failure recovery procedure, as described above. Further, in this case, a CORESET associated with the beam failure recovery SS set (e.g., the first SS set) may be used for another SS set (e.g., the second SS set) provided that the other SS set is linked with the beam failure recovery SS set for PDCCH repetition.

In some aspects, UE 120 may receive configuration information (e.g., a CORESET parameter, a QCL parameter, or a QCL relationship, among other examples) that links the beam failure recovery SS set with another SS set without the commonality condition satisfied. For example, network node 802 may link a first SS set for beam failure recovery, which associated with a first CORESET, with a second SS set (not for beam failure recovery), which is associated with a second CORESET that is different from the first CORESET. As another example, network node 802 may link a first SS set with a second SS set, and configure both the first SS set and the second SS set for beam failure recovery, where the first SS set and the second SS set are associated with different CORESETs. PDCCH candidates of the first SS set may have a first QCL parameter (e.g., a first QCL assumption and associated beam) and PDCCH candidates of the second SS set may have a second QCL parameter (e.g., a second QCL assumption and associated beam). In some aspects, when linked SS sets have different CORESETs, network node 802 and UE 120 may apply a newly identified beam of the beam recovery procedure, q_new, only to PDCCH candidates in the beam failure recovery SS set (e.g., the first SS set). In other words, UE 120 may apply q_new to the first SS set, and the UE 120 may continue using the second QCL assumption and associated beam for the second SS set (e.g., which may not be reset to q_new after PRACH transmission).

Alternatively, when linked SS sets have different CORESETs, UE 120 may identify a pair of beams in the beam recovery procedure, q_new_1 and q_new_2, and US 120 may apply the pair of beams to the respective SS sets's PDCCH candidates. In other words, network node 802 and UE 120 may apply q_new_1 to PDCCH candidates of the first SS set and q_new_2 to PDCCH candidates of the second SS set. In some aspects, UE 120 may indicate the pair of beams to network node 802 during PRACH transmission of the beam failure recovery procedure (e.g., rather than indicating a single beam, q_new, as described with regard to reference number 760 in FIG. 7). In some aspects, UE 120 may determine whether to apply a single beam q_new or a pair of beams q_new_1 and q_new_2 based at least in part on a PRACH occasion configuration. For example, when UE 120 is configured with a PRACH occasion or preamble associated with one candidate beam, UE 120 may report q_new and may apply q_new to the first SS set (and leave the second SS set unchanged). In contrast, when UE 120 is configured with a PRACH occasion or preamble associated with two candidate beams, UE 120 may report q_new_1 and q_new_2 and may apply q_new_1 to the first SS set and q_new_2 to the second SS set. Additionally, or alternatively, UE 120 may be configured with two PRACH occasions or preambles, each configured for a single candidate beam, and may report q_new_1 via a first PRACH occasion (and apply q_new_1 to the first SS set) and q_new_2 via a second PRACH occasion (and apply q_new_2 to the second SS set).

As further shown in FIG. 8, and by reference number 820, UE 120 may monitor for PDCCH candidates. For example, UE 120 may monitor for PDCCH candidates in accordance with a configuration for linking PDCCH candidates across SS sets. For example, when the beam failure recovery SS set may not be linked with another SS set (based at least in part on the UE 120 having the beam failure recovery SS set configured based at least in part on receiving a recoverySearchSpaceId parameter), UE 120 may monitor for PDCCH candidates associated with the beam failure recovery SS set and may not monitor for any other PDCCH candidates, in another SS set, that are linked to the PDCCH candidates associated with the beam failure recovery SS set. In this way, the UE 120 may reduce a monitoring, decoding, and/or processing complexity, which reduces processing utilization or energy resource utilization. Moreover, PDCCH repetition may not be used for a beam failure recovery response PDCCH.

Additionally, or alternatively, when the beam failure recovery SS set is linked with another SS set with the same CORESET, the UE 120 may monitor for PDCCH candidates of a first SS set (e.g., the beam failure recovery SS set) and PDCCH candidates of a second SS set (e.g., another SS set that is linked to the beam failure recovery SS set). Similarly, when the beam failure recovery SS set is linked with another SS set with a different CORESET UE 120 may monitor a first CORESET for PDCCH candidates of a first SS set and a second CORESET for PDCCH candidates of a second SS set. In these cases, by linking SS sets, an effective AL is increased by combining PDCCH candidates of the linked SS sets, thereby improving communication performance and/or a likelihood of successful reception.

In some aspects, UE 120 may monitor for a scheduled PDSCH associated with linked PDCCH candidates in two linked SS sets (e.g., the beam failure recovery SS set and another SS set). For example, UE 120 may monitor for the scheduled PDSCH using the same QCL assumption (beam) as is identified for the beam failure recovery SS set (the first SS set) (e.g., q_new or q_new_1). Additionally, or alternatively, UE 120 may monitor for the scheduled PDSCH using QCL assumptions (beams) identified for the first SS set and the second SS set (e.g., q_new or both q_new_1 and q_new_2). In some aspects, the PDSCH may be associated with two beams applied to different sets of symbols (e.g., in time division multiplexing), different sets of resource blocks (e.g., in frequency division multiplexing), different sets of layers (e.g., in spatial division multiplexing) with respect to each DMRS port and data layer (e.g., system frame number (SFN)) of the PDSCH.

As indicated above, FIG. 8 is provided as an example. Other examples may differ from what is described with respect to FIG. 8.

Figure 9:
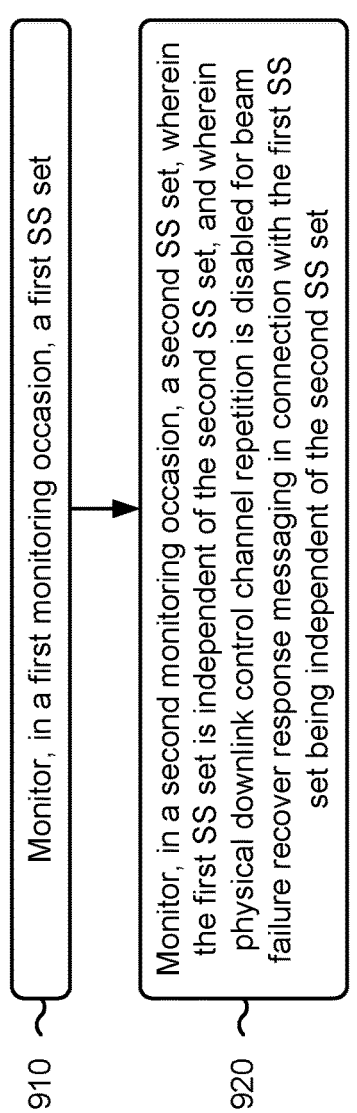

FIG. 9 is a diagram illustrating an example process 900 performed, for example, by a UE, in accordance with the present disclosure. Example process 900 is an example where the UE (e.g., UE 120) performs operations associated with configuration of a beam failure recovery SS set for PDCCH repetition.

As shown in FIG. 9, in some aspects, process 900 may include monitoring, in a first monitoring occasion, a first SS set (block 910). For example, the UE (e.g., using communication manager 140 and/or monitoring component 1208, depicted in FIG. 12) may monitor, in a first monitoring occasion, a first SS set, as described above.

As further shown in FIG. 9, in some aspects, process 900 may include monitoring, in a second monitoring occasion, a second SS set (block 920). For example, the UE (e.g., using communication manager 140 and/or monitoring component 1208, depicted in FIG. 12) may monitor, in a second monitoring occasion, a second SS set, as described above. In some aspects, the first SS set is independent of the second SS set. In some aspects, PDCCH repetition is disabled for beam failure recover response messaging in connection with the first SS set being independent of the second SS set, as described above.

Process 900 may include additional aspects, such as any single aspect or any combination of aspects described below and/or in connection with one or more other processes described elsewhere herein.

In an aspect, the first SS set is a recovery search space identifier configured SS set.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
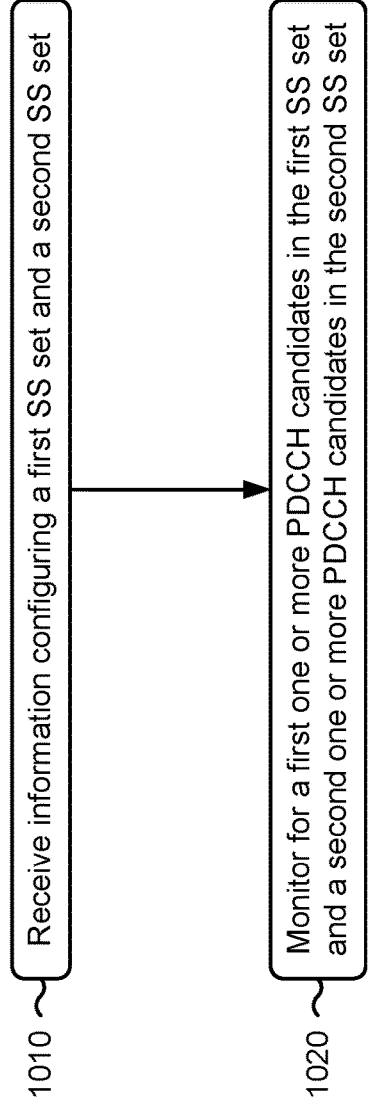

FIG. 10 is a diagram illustrating an example process 1000 performed, for example, by a UE, in accordance with the present disclosure. Example process 1000 is an example where the UE (e.g., UE 120) performs operations associated with configuration of a beam failure recovery SS set for PDCCH repetition.

As shown in FIG. 10, in some aspects, process 1000 may include receiving information configuring a first SS set and a second SS set (block 1010). For example, the UE (e.g., using communication manager 140 and/or reception component 1202, depicted in FIG. 12) may receive information configuring a first SS set and a second SS set, as described above. In some aspects, the first SS set is linked with the second SS set for PDCCH repetition. In some aspects, the first SS set is a recovery search space identifier configured SS set.

As further shown in FIG. 10, in some aspects, process 1000 may include monitoring for a first one or more PDCCH candidates in the first SS set and a second one or more PDCCH candidates in the second SS set (block 1020). For example, the UE (e.g., using communication manager 140 and/or monitoring component 1208, depicted in FIG. 12) may monitor for a first one or more PDCCH candidates in the first SS set and a second one or more PDCCH candidates in the second SS set, as described above. In some aspects, the first one or more PDCCH candidates and the second one or more PDCCH candidates are occurrences of a beam failure recovery response DCI.

Process 1000 may include additional aspects, such as any single aspect or any combination of aspects described below and/or in connection with one or more other processes described elsewhere herein.

In a first aspect, the first SS set and the second SS set are associated with a common CORESET.

In a second aspect, alone or in combination with the first aspect, the first one or more PDCCH candidates and the second one or more PDCCH candidates are associated with a common QCL parameter.

In a third aspect, alone or in combination with one or more of the first and second aspects, a QCL parameter of the common CORESET is based at least in part on a corresponding QCL parameter of a reference signal associated with a new identified beam after beam failure recovery detection.

In a fourth aspect, alone or in combination with one or more of the first through third aspects, the common CORESET is not associated with a third SS set that is different from the first SS set and the second SS set.

In a fifth aspect, the first SS set is associated with a first CORESET and the second SS set is associated with a second CORESET that is different from the first CORESET.

In a sixth aspect, alone or in combination with the fifth aspect, the first one or more PDCCH candidates are associated with a first QCL parameter and the second one or more PDCCH candidates are associated with a second QCL parameter that is different from the first QCL parameter.

In a seventh aspect, alone or in combination with one or more of the first through sixth aspects, a beam failure recovery identified beam is applied to the first one or more PDCCH candidates in the first SS set and not the second one or more PDCCH candidates in the second SS set.

In an eighth aspect, alone or in combination with one or more of the first through seventh aspects, a first beam failure recovery identified beam is applied to the first one or more PDCCH candidates in the first SS set and a second beam failure recovery identified beam is applied to the second one or more PDCCH candidates in the second SS set, and wherein the first beam failure recovery identified beam is different from the second beam failure recovery identified beam.

In a ninth aspect, alone or in combination with one or more of the first through eighth aspects, a quantity of indicated beam failure recovery identified beams is based at least in part on a quantity of beams associated with a physical random access channel communication. For example, the quantity of beam failure recovery identified beams, which are indicated to the network node, is based at least in part on the quantity of beams associated with the physical random access channel communication.

In a tenth aspect, alone or in combination with one or more of the first through ninth aspects, a quantity of indicated beam failure recovery identified beams is based at least in part on a quantity of physical random access channel communications that are configured. For example, the quantity of beam failure recovery identified beams, which are indicated to the network node, is based at least in part on the quantity of physical random access channel communications that are configured.

In an eleventh aspect, alone or in combination with one or more of the first through tenth aspects, process 1000 includes receiving a physical downlink shared channel using a quasi-co-location parameter associated with the first one or more PDCCH candidates in the first SS set.

In a twelfth aspect, alone or in combination with one or more of the first through eleventh aspects, process 1000 includes receiving a physical downlink shared channel using quasi-co-location parameters associated with the first one or more PDCCH candidates in the first SS set and the second one or more PDCCH candidates in the second SS set.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with the present disclosure. Example process 1100 is an example where the UE (e.g., the UE 120) performs operations associated with configuration of a beam failure recovery SS set for PDCCH repetition.

As shown in FIG. 11, in some aspects, process 1100 may include receiving, in a recovery search space identifier message, configuration information identifying a configuration of a first SS set, wherein the first SS set is configured for beam failure recovery monitoring (block 1110). For example, the UE (e.g., using communication manager 140 and/or reception component 1202, depicted in FIG. 12) may receive, in a recovery search space identifier message, configuration information identifying a configuration of a first SS set, wherein the first SS set is configured for beam failure recovery monitoring, as described above.

As further shown in FIG. 11, in some aspects, process 1100 may include monitoring, in a first monitoring occasion, the first SS set (block 1120). For example, the UE (e.g., using communication manager 140 and/or monitoring component 1208, depicted in FIG. 12) may monitor, in a first monitoring occasion, the first SS set, as described above.

As further shown in FIG. 11, in some aspects, process 1100 may include monitoring, in a second monitoring occasion, a second SS set, wherein the first SS set is not linked to the second SS set (block 1130). For example, the UE (e.g., using communication manager 140 and/or monitoring component 1208, depicted in FIG. 12) may monitor, in a second monitoring occasion, a second SS set, wherein the first SS set is not linked to the second SS set, as described above.

Process 1100 may include additional aspects, such as any single aspect or any combination of aspects described below and/or in connection with one or more other processes described elsewhere herein.

In a first aspect, process 1100 includes receiving first DCI associated with the first SS set, and receiving second DCI associated with the second SS set, wherein the second DCI is different from the first DCI.

In a second aspect, alone or in combination with the first aspect, the first SS set is disabled for physical downlink control channel repetition.

In a third aspect, alone or in combination with one or more of the first and second aspects, the second SS set is not linked with the first SS set based at least in part on the recovery search space identifier message conveying the configuration of the first SS set.

In a fourth aspect, alone or in combination with one or more of the first through third aspects, the second SS set is not linked to the first SS set for physical downlink control channel repetition.

In a fifth aspect, alone or in combination with one or more of the first through fourth aspects, the second SS set is linked to a third SS set for physical downlink control channel repetition.

In a sixth aspect, alone or in combination with one or more of the first through fifth aspects, the first SS set is a recovery search space identifier configured SS set.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
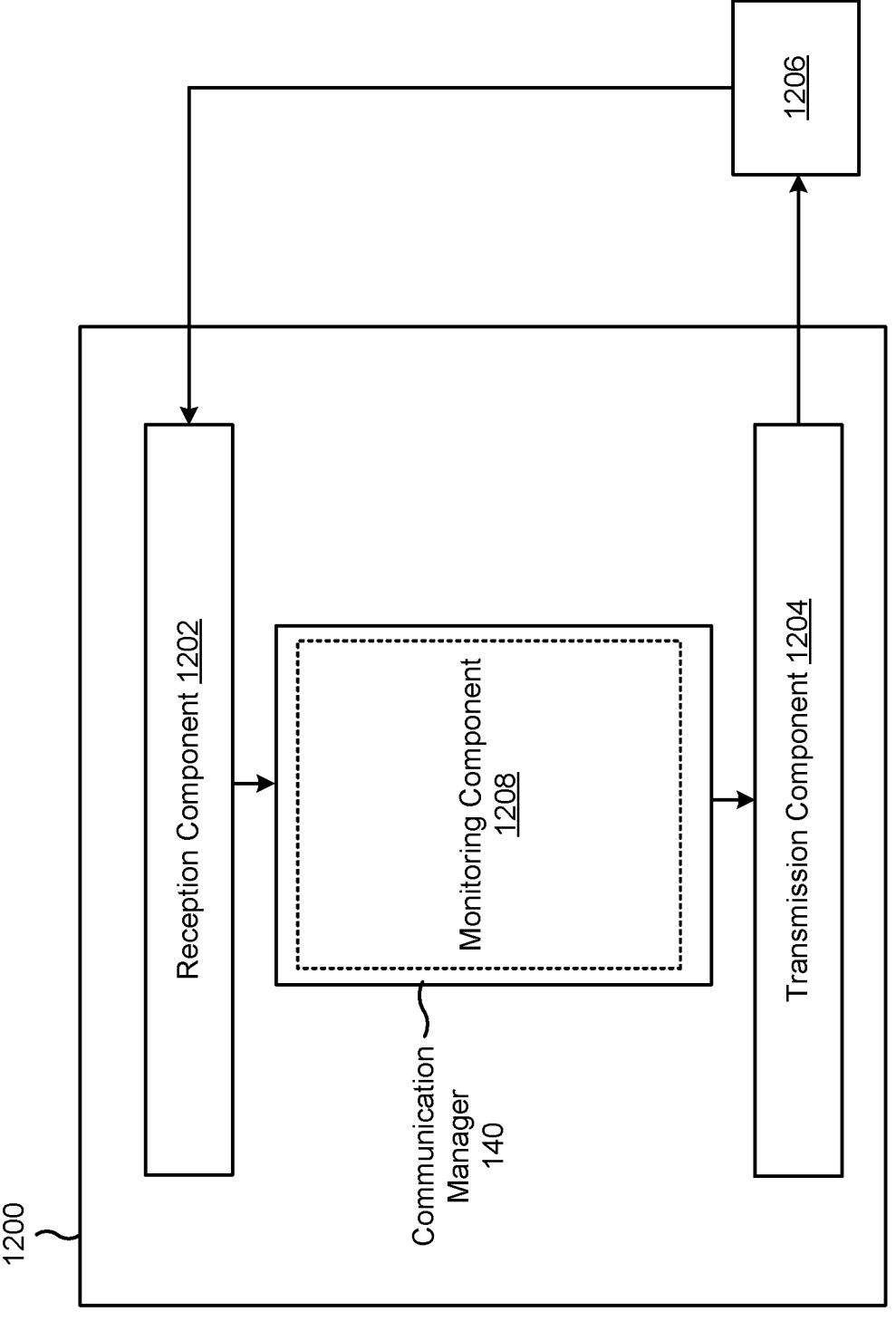
FIG. 12 is a diagram of an example apparatus for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a monitoring component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 900 of FIG. 9, process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The monitoring component 1208 may monitor, in a first monitoring occasion, a first SS set. The monitoring component 1208 may monitor, in a second monitoring occasion, a second SS set, wherein the first SS set is independent of the second SS set, and wherein physical downlink control channel repetition is disabled for beam failure recover response messaging in connection with the first SS set being independent of the second SS set.

The reception component 1202 may receive information configuring a first SS set and a second SS set, wherein the first SS set is linked with the second SS set for PDCCH repetition, and wherein the first SS set is a recovery search space identifier configured SS set. The monitoring component 1208 may monitor for a first one or more PDCCH candidates in the first SS set and a second one or more PDCCH candidates in the second SS set, wherein the first one or more PDCCH candidates and the second one or more PDCCH candidates are occurrences of a beam failure recovery response DCI.

The reception component 1202 may receive a physical downlink shared channel using a quasi-co-location parameter associated with the first one or more PDCCH candidates in the first SS set. The reception component 1202 may receive a physical downlink shared channel using quasi-co-location parameters associated with the first one or more PDCCH candidates in the first SS set and the second one or more PDCCH candidates in the second SS set.

The reception component 1202 may receive, in a recovery search space identifier message, configuration information identifying a configuration of a first SS set, wherein the first SS set is configured for beam failure recovery monitoring. The monitoring component 1208 may monitor, in a first monitoring occasion, the first SS set. The monitoring component 1208 may monitor, in a second monitoring occasion, a second SS set, wherein the first SS set is not linked to the second SS set. The reception component 1202 may receive first DCI associated with the first SS set. The reception component 1202 may receive second DCI associated with the second SS set, wherein the second DCI is different from the first DCI.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
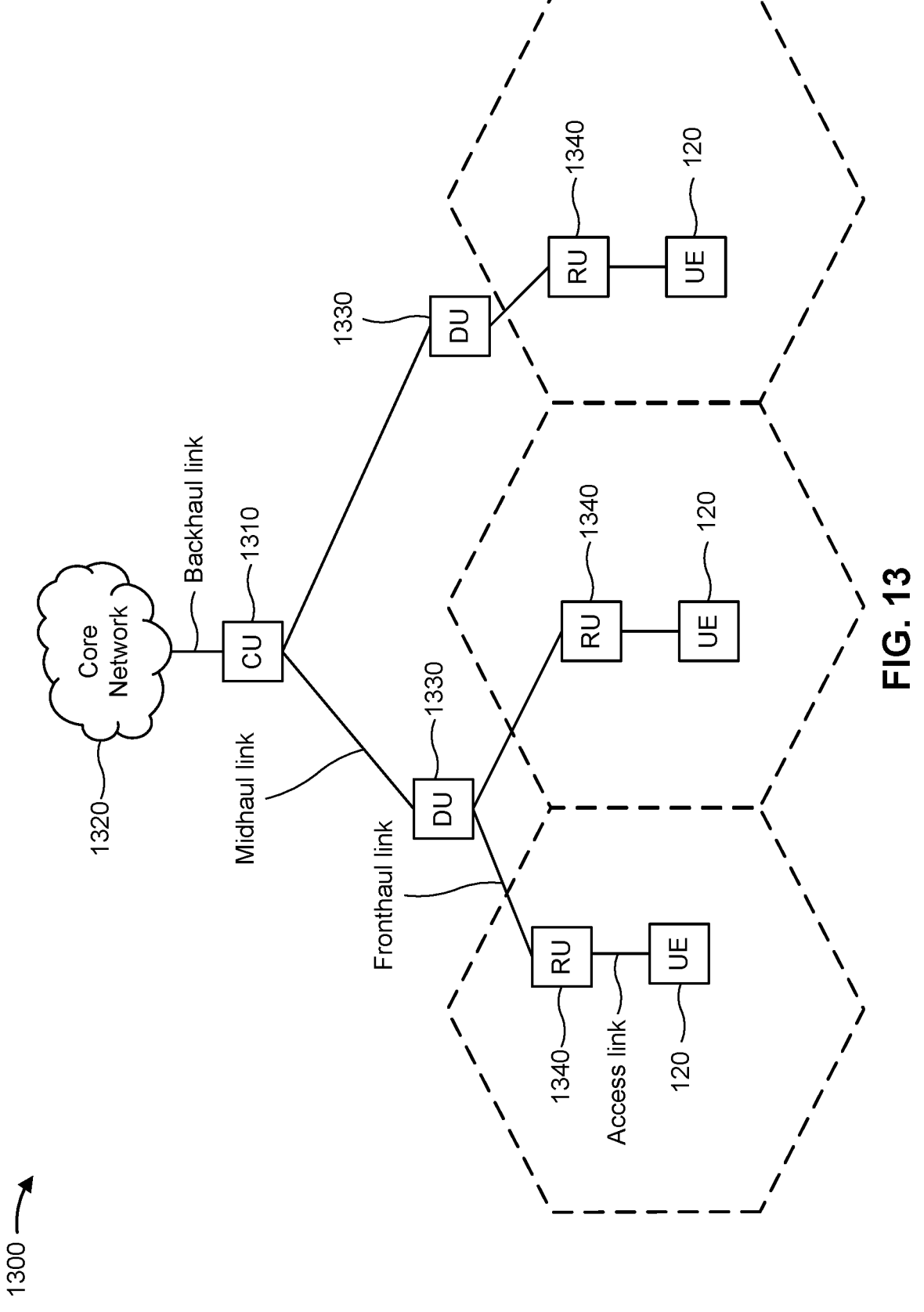
FIG. 13 is a diagram of an example open radio access network (O-RAN) architecture, in accordance with the present disclosure.

FIG. 13 is a diagram illustrating an example 1300 of an open radio access network (O-RAN) architecture, in accordance with the present disclosure. As shown in FIG. 13, the O-RAN architecture may include a control unit (CU) 1310 that communicates with a core network 1320 via a backhaul link. Furthermore, the CU 1310 may communicate with one or more distributed units (DUs) 1330 via respective midhaul links. The DUs 1330 may each communicate with one or more radio units (RUs) 1340 via respective fronthaul links, and the RUs 1340 may each communicate with respective UEs 120 via radio frequency (RF) access links. The DUs 1330 and the RUs 1340 may also be referred to as O-RAN DUs (O-DUs) 1330 and O-RAN RUs (O-RUs) 1340, respectively.

In some aspects, the DUs 1330 and the RUs 1340 may be implemented according to a functional split architecture in which functionality of a network entity 110 (e.g., an eNB or a gNB) is provided by a DU 1330 and one or more RUs 1340 that communicate over a fronthaul link. Accordingly, as described herein, a network entity 110 may include a DU 1330 and one or more RUs 1340 that may be co-located or geographically distributed. In some aspects, the DU 1330 and the associated RU(s) 1340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1330 may correspond to a logical unit that includes one or more base station functions to control the operation of one or more RUs 1340. For example, in some aspects, the DU 1330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 1310. The RU(s) 1340 controlled by a DU 1330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 1340 handle all over the air (OTA) communication with a UE 120, and real-time and non-real-time aspects of control and user plane communication with the RU(s) 1340 are controlled by the corresponding DU 1330, which enables the DU(s) 1330 and the CU 1310 to be implemented in a cloud-based RAN architecture.

As indicated above, FIG. 13 is provided as an example. Other examples may differ from what is described with regard to FIG. 13.

The following provides an overview of some Aspects of the present disclosure:

Aspect 1: A method of wireless communication performed by a user equipment (UE), comprising: monitoring, in a first monitoring occasion, a first search space (SS) set; and monitoring, in a second monitoring occasion, a second SS set, wherein the first SS set is independent of the second SS set, and wherein physical downlink control channel repetition is disabled for beam failure recover response messaging in connection with the first SS set being independent of the second SS set. For example, the first SS set is not linked with the second SS set, thereby making the first SS set independent of the second SS set.

Aspect 2: The method of Aspect 1, wherein the first SS set is a recovery search space identifier configured SS set.

Aspect 3: A method of wireless communication performed by a user equipment (UE), comprising: receiving information configuring a first search space (SS) set and a second SS set, wherein the first SS set is linked with the second SS set for physical downlink control channel (PDCCH) repetition, and wherein the first SS set is a recovery search space identifier configured SS set; and monitoring for a first one or more PDCCH candidates in the first SS set and a second one or more PDCCH candidates in the second SS set, wherein the first one or more PDCCH candidates and the second one or more PDCCH candidates are occurrences of a beam failure recovery response downlink control information (DCI).

Aspect 4: The method of Aspect 3, wherein the first SS set and the second SS set are associated with a common control resource set (CORESET).

Aspect 5: The method of Aspect 4, wherein the first one or more PDCCH candidates and the second one or more PDCCH candidates are associated with a common quasi-co-location (QCL) parameter.

Aspect 6: The method of any of Aspect 4, wherein a quasi-co-location (QCL) parameter of the common CORESET is based at least in part on a corresponding QCL parameter of a reference signal associated with a new identified beam after beam failure recovery detection.

Aspect 7: The method of Aspect 4, wherein the common CORESET is not associated with a third SS set that is different from the first SS set and the second SS set.

Aspect 8: The method of any of Aspects 3 to 7, wherein the first SS set is associated with a first control resource set (CORESET) and the second SS set is associated with a second CORESET that is different from the first CORESET.

Aspect 9: The method of Aspect 8, wherein the first one or more PDCCH candidates are associated with a first quasi-co-location (QCL) parameter and the second one or more PDCCH candidates are associated with a second QCL parameter that is different from the first QCL parameter.

Aspect 10: The method of Aspect 8, wherein a beam failure recovery identified beam is applied to the first one or more PDCCH candidates in the first SS set and not the second one or more PDCCH candidates in the second SS set.

Aspect 11: The method of Aspect 8, wherein a first beam failure recovery identified beam is applied to the first one or more PDCCH candidates in the first SS set and a second beam failure recovery identified beam is applied to the second one or more PDCCH candidates in the second SS set, and wherein the first beam failure recovery identified beam is different from the second beam failure recovery identified beam.

Aspect 12: The method of any of Aspects 3 to 11, wherein a quantity of indicated beam failure recovery identified beams is based at least in part on a quantity of beams associated with a physical random access channel communication.

Aspect 13: The method of any of Aspects 3 to 12, wherein a quantity of indicated beam failure recovery identified beams is based at least in part on a quantity of physical random access channel communications that are configured.

Aspect 14: The method of any of Aspects 3 to 13, further comprising: receiving a physical downlink shared channel using a quasi-co-location parameter associated with the first one or more PDCCH candidates in the first SS set.

Aspect 15: The method of any of Aspects 3 to 13, further comprising: receiving a physical downlink shared channel using quasi-co-location parameters associated with the first one or more PDCCH candidates in the first SS set and the second one or more PDCCH candidates in the second SS set.

Aspect 16: A method of wireless communication, comprising: receiving, in a recovery search space identifier message, configuration information identifying a configuration of a first search space (SS) set, wherein the first SS set is configured for beam failure recovery monitoring; monitoring, in a first monitoring occasion, the first SS set; and monitoring, in a second monitoring occasion, a second SS set, wherein the first SS set is not linked to the second SS set.

Aspect 17: The method of Aspect 16, further comprising: receiving first downlink control information (DCI) associated with the first SS set; and receiving second DCI associated with the second SS set, wherein the second DCI is different from the first DCI.

Aspect 18: The method of any of Aspects 16 to 17, wherein the first SS set is disabled for physical downlink control channel repetition.

Aspect 19: The method of any of Aspects 16 to 18, wherein the second SS set is not linked with the first SS set based at least in part on the recovery search space identifier message conveying the configuration of the first SS set.

Aspect 20: The method of any of Aspects 16 to 19, wherein the second SS set is not linked to the first SS set for physical downlink control channel repetition.

Aspect 21: The method of any of Aspects 16 to 20, wherein the second SS set is linked to a third SS set for physical downlink control channel repetition.

Aspect 22: The method of any of Aspects 16 to 21, wherein the first SS set is a recovery search space identifier configured SS set.

Aspect 23: An apparatus for wireless communication at a device, comprising a processor; memory coupled with the processor; and instructions stored in the memory and executable by the processor to cause the apparatus to perform the method of one or more of Aspects 1-2.

Aspect 24: A device for wireless communication, comprising memory, and one or more processors coupled to the memory, the memory comprising instructions executable by the one or more processors to cause the device to perform the method of one or more of Aspects 1-2.

Aspect 25: A device for wireless communication, comprising a memory and one or more processors coupled to the memory, the one or more processors configured to perform the method of one or more of Aspects 1-2.

Aspect 26: An apparatus for wireless communication, comprising at least one means for performing the method of one or more of Aspects 1-2.

Aspect 27: A non-transitory computer-readable medium storing code for wireless communication, the code comprising instructions executable by a processor to perform the method of one or more of Aspects 1-2.

Aspect 28: A non-transitory computer-readable medium storing a set of instructions for wireless communication, the set of instructions comprising one or more instructions that, when executed by one or more processors of a device, cause the device to perform the method of one or more of Aspects 1-2.

Aspect 29: An apparatus for wireless communication at a device, comprising a processor; memory coupled with the processor; and instructions stored in the memory and executable by the processor to cause the apparatus to perform the method of one or more of Aspects 3-15.

Aspect 30: A device for wireless communication, comprising memory, and one or more processors coupled to the memory, the memory comprising instructions executable by the one or more processors to cause the device to perform the method of one or more of Aspects 3-15.

Aspect 31: A device for wireless communication, comprising a memory and one or more processors coupled to the memory, the one or more processors configured to perform the method of one or more of Aspects 3-15.

Aspect 32: An apparatus for wireless communication, comprising at least one means for performing the method of one or more of Aspects 3-15.

Aspect 33: A non-transitory computer-readable medium storing code for wireless communication, the code comprising instructions executable by a processor to perform the method of one or more of Aspects 3-15.

Aspect 34: A non-transitory computer-readable medium storing a set of instructions for wireless communication, the set of instructions comprising one or more instructions that, when executed by one or more processors of a device, cause the device to perform the method of one or more of Aspects 3-15.

Aspect 35: An apparatus for wireless communication at a device, comprising a processor; memory coupled with the processor; and instructions stored in the memory and executable by the processor to cause the apparatus to perform the method of one or more of Aspects 16-22.

Aspect 36: A device for wireless communication, comprising memory, and one or more processors coupled to the memory, the memory comprising instructions executable by the one or more processors to cause the device to perform the method of one or more of Aspects 16-22.

Aspect 37: A device for wireless communication, comprising a memory and one or more processors coupled to the memory, the one or more processors configured to perform the method of one or more of Aspects 16-22.

Aspect 38: An apparatus for wireless communication, comprising at least one means for performing the method of one or more of Aspects 16-22.

Aspect 39: A non-transitory computer-readable medium storing code for wireless communication, the code comprising instructions executable by a processor to perform the method of one or more of Aspects 16-22.

Aspect 40: A non-transitory computer-readable medium storing a set of instructions for wireless communication, the set of instructions comprising one or more instructions that, when executed by one or more processors of a device, cause the device to perform the method of one or more of Aspects 16-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, the one or more memories comprising instructions configurable to be executed by the one or more processors to cause the UE to:

receive, in a recovery search space identifier message, configuration information identifying a configuration of a first search space (SS) set, wherein the first SS set is configured for beam failure recovery monitoring;

monitor, in a first monitoring occasion, for first downlink control information (DCI) associated with a beam failure recovery response in the first SS set without monitoring for repetition, wherein the first SS set is not linked with another SS set;

receive, in the first monitoring occasion, the first downlink control information (DCI) associated with the beam failure recovery response;

monitor, in a second monitoring occasion, for a second SS set, wherein the first SS set is not linked to the second SS set; and receive, in the second monitoring occasion, second DCI associated with the second SS set.

2. The UE of claim 1,
wherein the first SS set is disabled for physical downlink control channel repetition.

3. The UE of claim 1,
wherein the second SS set is not linked with the first SS set based at least in part on the recovery search space identifier message conveying the configuration of the first SS set.

4. The UE of claim 1,
wherein the second SS set is not linked to the first SS set for physical downlink control channel repetition.

5. The UE of claim 1,
wherein the second SS set is linked to a third SS set for physical downlink control channel repetition.

6. The UE of claim 1,
wherein the first SS set is a recovery search space identifier configured SS set.

7. A method of wireless communication performed by a user equipment (UE), comprising:

receiving, in a recovery search space identifier message, configuration information identifying a configuration of a first search space (SS) set, wherein the first SS set is configured for beam failure recovery monitoring;

monitoring, in a first monitoring occasion, for first downlink control information (DCI) associated with a beam failure recovery response in the first SS set without monitoring for repetition, wherein the first SS set is not linked with another SS set;

receiving, in the first monitoring occasion, the first downlink control information (DCI) associated with the beam failure recovery response;

monitoring, in a second monitoring occasion, for a second SS set, wherein the first SS set is not linked to the second SS set; and receiving, in the second monitoring occasion, second DCI associated with the second SS set.

8. The method of claim 7,
wherein the first SS set is disabled for physical downlink control channel repetition.

9. The method of claim 7,
wherein the second SS set is not linked with the first SS set based at least in part on the recovery search space identifier message conveying the configuration of the first SS set.

10. The method of claim 7,
wherein the second SS set is not linked to the first SS set for physical downlink control channel repetition.

11. The method of claim 7,
wherein the second SS set is linked to a third SS set for physical downlink control channel repetition.

12. The method of claim 7,
wherein the first SS set is a recovery search space identifier configured SS set.

13. A non-transitory computer-readable medium storing a set of instructions, the set of instructions comprising:

one or more instructions that, when executed by one or more processors of a user equipment (UE), cause the UE to:

receive, in a recovery search space identifier message, configuration information identifying a configuration of a first search space (SS) set, wherein the first SS set is configured for beam failure recovery monitoring;

monitor, in a first monitoring occasion, for first downlink control information DCI) associated with a beam failure recovery response in the first SS set without monitoring for repetition, wherein the first SS set is not linked with another SS set;

receive, in the first monitoring occasion, the first downlink control information (DCI) associated with the beam failure recovery response;

monitor, in a second monitoring occasion, for a second SS set, wherein the first SS set is not linked to the second SS set; and receive, in the second monitoring occasion, second DCI associated with the second SS set.

14. The non-transitory computer-readable medium of claim 13,
wherein the first SS set is disabled for physical downlink control channel repetition.

15. The non-transitory computer-readable medium of claim 13,
wherein the second SS set is not linked with the first SS set based at least in part on the recovery search space identifier message conveying the configuration of the first SS set.

16. The non-transitory computer-readable medium of claim 13,
wherein the second SS set is not linked to the first SS set for physical downlink control channel repetition.

17. The non-transitory computer-readable medium of claim 13,
wherein the second SS set is linked to a third SS set for physical downlink control channel repetition.

18. The non-transitory computer-readable medium of claim 13,
wherein the first SS set is a recovery search space identifier configured SS set.

19. An apparatus, comprising:

means for receiving, in a recovery search space identifier message, configuration information identifying a configuration of a first search space (SS) set, wherein the first SS set is configured for beam failure recovery monitoring;

means for monitoring, in a first monitoring occasion, for first downlink control information (DCI) associated with a beam failure recovery response in the first SS set without monitoring for repetition, wherein the first SS set is not linked with another SS set;

means for receiving, in the first monitoring occasion, the first downlink control information (DCI) associated with the beam failure recovery response;

means for monitoring, in a second monitoring occasion, for a second SS set, wherein the first SS set is not linked to the second SS set; and means for receiving, in the second monitoring occasion, second DCI associated with the second SS set.

20. The apparatus of claim 19, wherein the first SS set is disabled for physical downlink control channel repetition.

21. The apparatus of claim 19, wherein the second SS set is not linked with the first SS set based at least in part on the recovery search space identifier message conveying the configuration of the first SS set.

22. The apparatus of claim 19, wherein the second SS set is not linked to the first SS set for physical downlink control channel repetition.

23. The apparatus of claim 19, wherein the second SS set is linked to a third SS set for physical downlink control channel repetition.

24. The apparatus of claim 19, wherein the first SS set is a recovery search space identifier configured SS set.

* * * * *